US012603098B2

(12) United States Patent
Sun

(10) Patent No.: US 12,603,098 B2
(45) Date of Patent: Apr. 14, 2026

(54) AUTOMATIC GAIN CONTROL METHOD AND APPARATUS FOR VOICE INTERACTION SYSTEM, AND SYSTEM

(71) Applicant: ESPRESSIF SYSTEMS (SHANGHAI) CO., LTD., Shanghai (CN)

(72) Inventor: Xiangyu Sun, Shanghai (CN)

(73) Assignee: ESPRESSIF SYSTEMS (SHANGHAI) CO., LTD., Shanghai (CN)

( * ) Notice: Subject to any disclaimer, the term of this patent is extended or adjusted under 35 U.S.C. 154(b) by 159 days.

(21) Appl. No.: 18/293,643

(22) PCT Filed: Jul. 29, 2022

(86) PCT No.: PCT/CN2022/109240
§ 371 (c)(1),
(2) Date: Jan. 30, 2024

(87) PCT Pub. No.: WO2023/006107
PCT Pub. Date: Feb. 2, 2023

(65) Prior Publication Data
US 2025/0118323 A1 Apr. 10, 2025

(30) Foreign Application Priority Data
Jul. 30, 2021 (CN) .......................... 202110878010.5

(51) Int. Cl.
*G10L 21/034* (2013.01)
*G10L 15/08* (2006.01)
(Continued)

(52) U.S. Cl.
CPC ............ *G10L 21/034* (2013.01); *G10L 15/08* (2013.01); *G10L 15/22* (2013.01); *G10L 21/028* (2013.01);
(Continued)

(58) Field of Classification Search
CPC ....... G10L 21/034; G10L 15/08; G10L 15/22; G10L 21/028; G10L 21/0364;
(Continued)

(56) References Cited

U.S. PATENT DOCUMENTS

| | | | |
|---|---|---|---|
| 5,146,504 A | 9/1992 | Pinckley | |
| 10,192,546 B1 | 1/2019 | Piersol | |

(Continued)

FOREIGN PATENT DOCUMENTS

| | | | |
|---|---|---|---|
| CN | 101019465 A | 8/2007 | |
| CN | 101278337 A | 10/2008 | |

(Continued)

OTHER PUBLICATIONS

International Search Report and Written Opinion from Corresponding PCT Application No. PCT/CN2022/109240 with English Translation Feb. 2, 2023.

(Continued)

*Primary Examiner* — Abul K Azad
(74) *Attorney, Agent, or Firm* — Aird & McBurney LP

(57) ABSTRACT

The present application discloses an automatic gain control method and apparatus for a voice interaction system, a system, and a computer-readable storage medium. The method comprises: receiving a voice signal; dividing the received voice signal into a plurality of sound signals of different sound sources by blind source separation; invoking a pre-trained wake-up word detection model to perform wake-up word detection on the sound signals of different sound sources respectively, to determine a sound signal in which a wake-up word is detected; calculating, based on the sound signal in which the wake-up word is detected, a gain required for automatic gain control of the voice interaction system, to adjust a volume of picked-up audio data within a preset range.

16 Claims, 4 Drawing Sheets

(51) Int. Cl.
G10L 15/22       (2006.01)
G10L 21/028      (2013.01)
G10L 21/0364    (2013.01)

(52) U.S. Cl.
CPC .... G10L 21/0364 (2013.01); G10L 2015/088 (2013.01)

(58) Field of Classification Search
CPC ............. G10L 2015/088; G10L 15/063; G10L 15/285; G10L 15/28; G10L 2015/223; G10L 21/0272; G10L 15/20; G10L 17/04; G10L 17/20; G10L 17/24
See application file for complete search history.

(56) References Cited

U.S. PATENT DOCUMENTS

| | | | | |
|---|---|---|---|---|
| 2019/0139545 A1* | 5/2019 | Yuan | ........................ | G10L 15/08 |
| 2020/0128317 A1* | 4/2020 | Feldman | ................ | H04R 1/083 |
| 2020/0279575 A1 | 9/2020 | Unno | | |
| 2021/0142788 A1* | 5/2021 | Choi | ........................ | G10L 15/08 |
| 2022/0139377 A1* | 5/2022 | Lee | ......................... | G10L 15/08 |
| | | | | 704/200 |

| | | | | |
|---|---|---|---|---|
| 2022/0375469 A1* | 11/2022 | Yang | ..................... | G10L 13/027 |

FOREIGN PATENT DOCUMENTS

| | | |
|---|---|---|
| CN | 102437825 A | 5/2012 |
| CN | 102915753 A | 2/2013 |
| CN | 103039023 A | 4/2013 |
| CN | 103827965 A | 5/2014 |
| CN | 107123429 A | 9/2017 |
| CN | 108615535 A | 10/2018 |
| CN | 109192219 A | 1/2019 |
| CN | 110364166 A | 10/2019 |
| CN | 110875045 A | 3/2020 |
| CN | 110914901 A | 3/2020 |
| CN | 111667843 A | 9/2020 |
| CN | 112397083 A | 2/2021 |
| CN | 113555033 A | 10/2021 |

OTHER PUBLICATIONS

Office Action from Priority Application No. 202110878010.5 with English Translation Sep. 20, 2023.

* cited by examiner

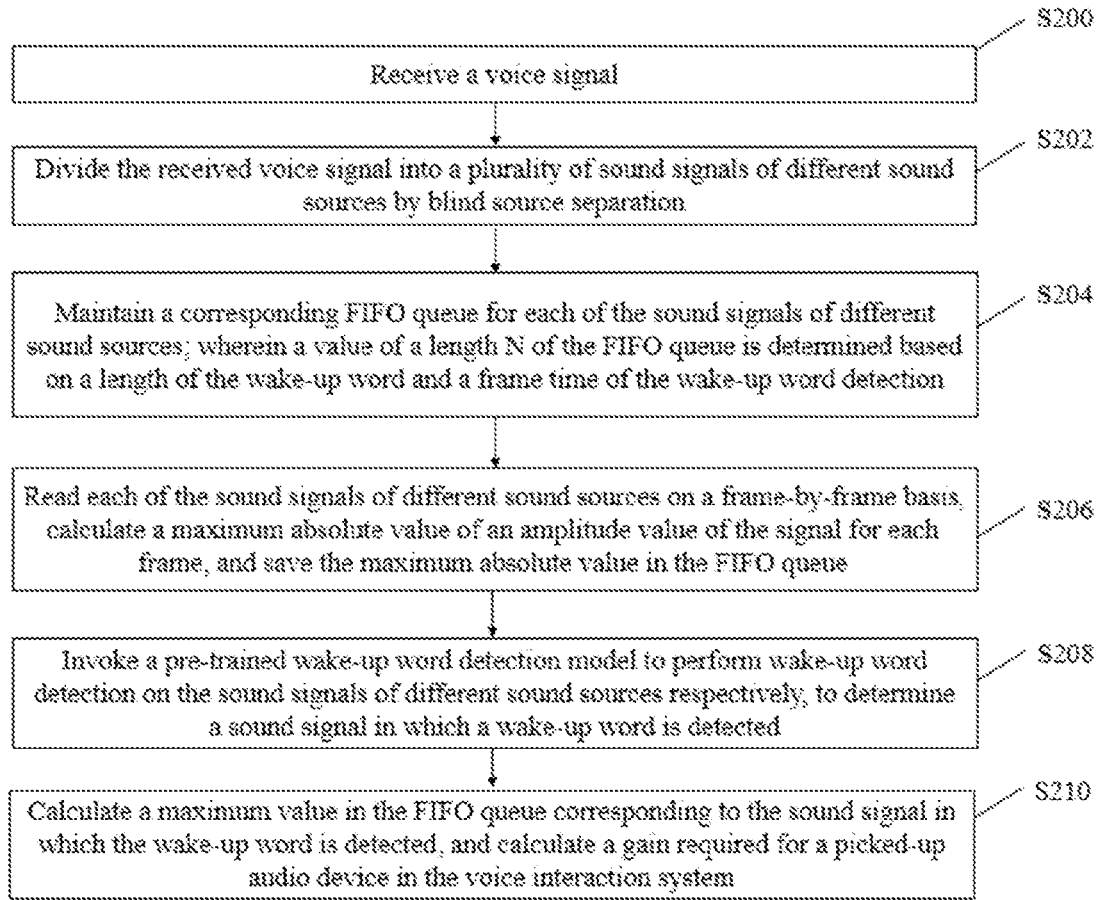

S200

Receive a voice signal

S202

Divide the received voice signal into a plurality of sound signals of different sound sources by blind source separation

S204

Maintain a corresponding FIFO queue for each of the sound signals of different sound sources; wherein a value of a length N of the FIFO queue is determined based on a length of the wake-up word and a frame time of the wake-up word detection

S206

Read each of the sound signals of different sound sources on a frame-by-frame basis, calculate a maximum absolute value of an amplitude value of the signal for each frame, and save the maximum absolute value in the FIFO queue

S208

Invoke a pre-trained wake-up word detection model to perform wake-up word detection on the sound signals of different sound sources respectively, to determine a sound signal in which a wake-up word is detected

S210

Calculate a maximum value in the FIFO queue corresponding to the sound signal in which the wake-up word is detected, and calculate a gain required for a picked-up audio device in the voice interaction system

FIG. 2

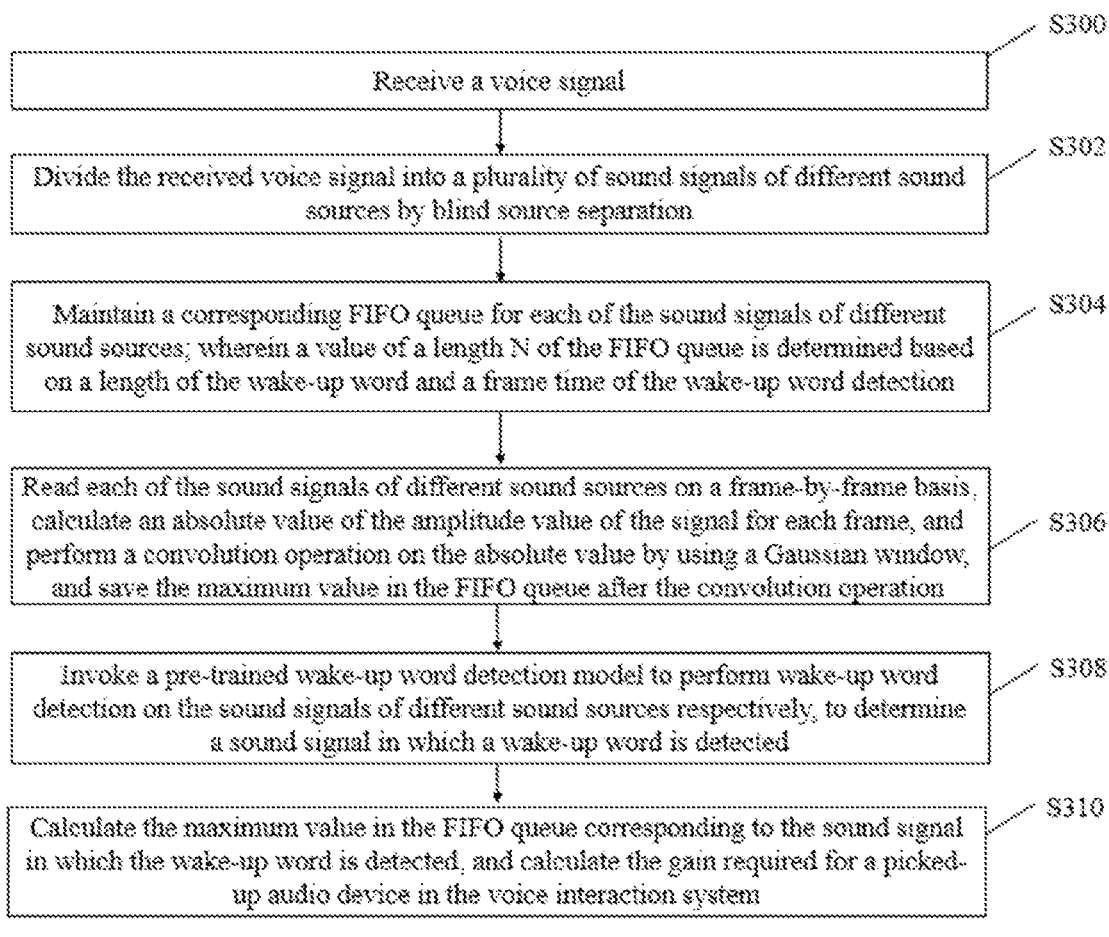

S300

Receive a voice signal

S302

Divide the received voice signal into a plurality of sound signals of different sound sources by blind source separation

S304

Maintain a corresponding FIFO queue for each of the sound signals of different sound sources, wherein a value of a length N of the FIFO queue is determined based on a length of the wake-up word and a frame time of the wake-up word detection

S306

Read each of the sound signals of different sound sources on a frame-by-frame basis, calculate an absolute value of the amplitude value of the signal for each frame, and perform a convolution operation on the absolute value by using a Gaussian window, and save the maximum value in the FIFO queue after the convolution operation

S308

Invoke a pre-trained wake-up word detection model to perform wake-up word detection on the sound signals of different sound sources respectively, to determine a sound signal in which a wake-up word is detected

S310

Calculate the maximum value in the FIFO queue corresponding to the sound signal in which the wake-up word is detected, and calculate the gain required for a picked-up audio device in the voice interaction system

FIG. 3

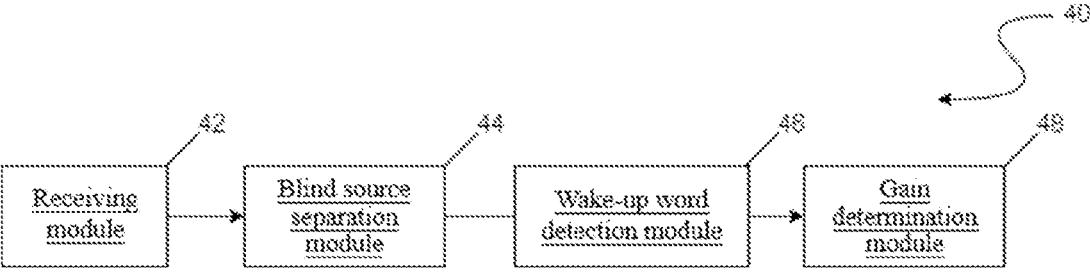

40

42

Receiving module

44

Blind source separation module

46

Wake-up word detection module

48

Gain determination module

AUTOMATIC GAIN CONTROL METHOD AND APPARATUS FOR VOICE INTERACTION SYSTEM, AND SYSTEM

CROSS-REFERENCE TO RELATED APPLICATIONS

This application is the U.S. National Phase Application under 35 U.S.C. § 371 of International Patent Application No. PCT/CN2022/109240 filed on Jul. 29, 2022, which claims priority to Chinese Patent Application CN202110878010.5 filed on Jul. 30, 2021. The disclosures of the aforementioned applications are hereby incorporated by reference in their entireties.

TECHNICAL FIELD

The present application relates to the field of voice interaction technology, and in particular to an automatic gain control method and apparatus for a voice interaction system, a system, and a computer-readable storage medium.

BACKGROUND

With the popularization of intelligent technology, it has been applied in every aspect of life in clothing, food, housing, and transportation, such as smart speakers, smart TVs, etc. Intelligent technology provides convenient and fast services for people's lives. Intelligent voice interaction is an intelligent technology that is currently widely used. Intelligent voice interaction refers to an interaction method based on voice input, which allows users to control and manipulate devices directly using voice. This interaction method can effectively free up hands, minimize the difficulty of operation, and considerably facilitate the use by users.

Voice interaction can be categorized into far-field voice and near-field voice. Compared with near-field voice, the distance between the speaker and the device is usually between one meter and ten meters during far-field voice interaction. The front-end thereof usually takes a microphone array as a picked-up audio device, and picked-up sound signals are for subsequent speech recognition processing.

Since in far-field voice interaction, the sound picked up by the picked-up audio device has a large dynamic range, it is required that the picked-up audio device has an automatic gain control (AGCA) function to control the volume of the picked-up sound within a reasonable range, thereby ensuring the accuracy of speech recognition. In actual far-field voice interaction scenarios, interference factors such as background noise, voices of multiple speakers, and playback sound of the device itself may be included. Therefore, how to accurately calculate the required gain is one of the technical problems that the inventor of the present application intends to solve.

It should be appreciated that the technical problems listed above are only examples and not limitations of the present application. The present application is not limited to technical solutions that simultaneously solve all of the above technical problems. The technical solutions of the present application may be implemented to solve one or more of the above or other technical problems.

SUMMARY

In order to solve the above problems, the present application provides an automatic gain control method for a voice interaction system, including:

2 receiving a voice signal;

dividing the received voice signal into a plurality of sound signals of different sound sources by blind source separation;

invoking a pre-trained wake-up word detection model to perform wake-up word detection on the sound signals of different sound sources respectively, to determine a sound signal in which a wake-up word is detected; and calculating, based on the sound signal in which the wake-up word is detected, a gain required for automatic gain control of the voice interaction system, to adjust a volume of picked-up audio data within a preset range.

Optionally, after the dividing the received voice signal into a plurality of sound signals of different sound sources by blind source separation, the method further includes:

maintaining a corresponding FIFO queue for each of the sound signals of different sound sources; wherein, a value of a length N of the FIFO queue is determined based on a length of the wake-up word and a frame time of the wake-up word detection; and reading each of the sound signals of different sound sources on a frame-by-frame basis, calculating a maximum absolute value of an amplitude value of the signal for each frame, and saving the maximum absolute value in the FIFO queue.

Optionally, after the dividing the received voice signal into a plurality of sound signals of different sound sources by blind source separation, the method further includes:

maintaining a corresponding FIFO queue for each of the sound signals of different sound sources; wherein, a value of a length N of the FIFO queue is determined based on a length of the wake-up word and a frame time of the wake-up word detection;

reading each of the sound signals of different sound sources on a frame-by-frame basis, calculating an absolute value of an amplitude value of the signal for each frame, and performing a convolution operation on the absolute value by using a Gaussian window, and saving the maximum value in the FIFO queue after the convolution operation.

Optionally, a product of the length N of the FIFO queue and the frame time of the wake-up word detection is equal to a length of the wake-up word.

Optionally, the calculating a gain required for automatic gain control of the voice interaction system includes:

calculating a maximum value $A_{max}$ in the FIFO queue corresponding to the sound signal in which the wake-up word is detected, and according to $$G = \begin{cases} \dfrac{A_{ref}}{A_{max}}, & A_{max} < A_{ref} \\ 1, & A_{max} \geq A_{ref} \end{cases}$$

calculating a gain G required for a picked-up audio device in the voice interaction system;

wherein, $A_{ref}$ is an amplitude value of a reference audio signal, the reference audio signal is a fixed value.

Optionally, after the calculating a gain required for automatic gain control of the voice interaction system, the method further includes:

adjusting an analog gain to a required gain G, if an adjustable range $G_a$ of the analog gain is less than the required gain G, then adjusting the analog gain to maximum and adjusting a digital gain to $G-G_a$.

Optionally, the method further includes: restoring the gain to an initial gain $G_{init}$ after detecting the completion of the voice interaction.

Optionally, the initial gain $G_{init}$ is: a gain corresponding to ensuring that the audio data picked up by the picked-up audio device is not saturated when the reference audio signal value is determined.

Optionally, the wake-up word detection model is a model obtained by pre-training using delta-LFBE as a feature.

The present application further provides an automatic gain control apparatus for a voice interaction system, including:

a receiving module configured to receive a voice signal;

a blind source separation module configured to divide the received voice signal into a plurality of sound signals of different sound sources by blind source separation;

a wake-up word detection module configured to invoke a pre-trained wake-up word detection model to perform wake-up word detection on the sound signals of different sound sources respectively, to determine a sound signal in which a wake-up word is detected; and a gain determination module configured to calculate, based on the sound signal in which the wake-up word is detected as a reference audio signal, a gain required for automatic gain control of the voice interaction system, to adjust a volume of picked-up audio data within a preset range.

The present application further provides a voice interaction system, including: a memory and a processor; wherein the memory is configured to store instructions; the processor, when invoking the instructions, executes the method described in any of the above.

The present application further provides a computer-readable storage medium including instructions that, when executed, implement the method described in any of the above.

The automatic gain control method of the voice interaction system provided by the present application receives a voice signal, divides the received voice signal into a plurality of sound signals of different sound sources by blind source separation, invokes a pre-trained wake-up word detection model to perform wake-up word detection on the sound signals of different sound sources respectively, to determine a sound signal in which the wake-up word is detected; calculates, based on the sound signal in which the wake-up word is detected, a gain required for automatic gain control of the voice interaction system, to adjust the volume of picked-up audio data within a preset range. The present application employs wake-up word detection in real usage scenarios to distinguish the sound signal in which the wake-up word is detected from other noise signals, and takes the sound signal in which the wake-up word is detected as an adjustment reference for performing automatic gain control, which can accurately calculate the gain required for each interaction, ensure the accuracy of speech recognition, and improve interaction experience of users. In addition, the present application further provides an automatic gain control apparatus for a voice interaction system, a system, and a computer-readable storage medium with the above technical effects.

BRIEF DESCRIPTION OF THE DRAWINGS

The present application will be further explained below based on embodiments with reference to the accompanying drawings.

FIG. 2 schematically illustrates a flow chart of another specific embodiment of the automatic gain control method of the voice interaction system provided by the present application;

FIG. 3 schematically illustrates a flow chart of yet another specific embodiment of the automatic gain control method of the voice interaction system provided by the present application;

FIG. 4 schematically illustrates a structural block diagram of a specific embodiment of an automatic gain control apparatus of the voice interaction system provided by the present application.

DETAILED DESCRIPTION OF THE PREFERRED EMBODIMENTS

The method and apparatus of the present application will be described in detail below with reference to the accompanying drawings and specific embodiments. It should be appreciated that the embodiments shown in the accompanying drawings and described below are merely illustrative and not intended to limit the present application.

Figure 1:
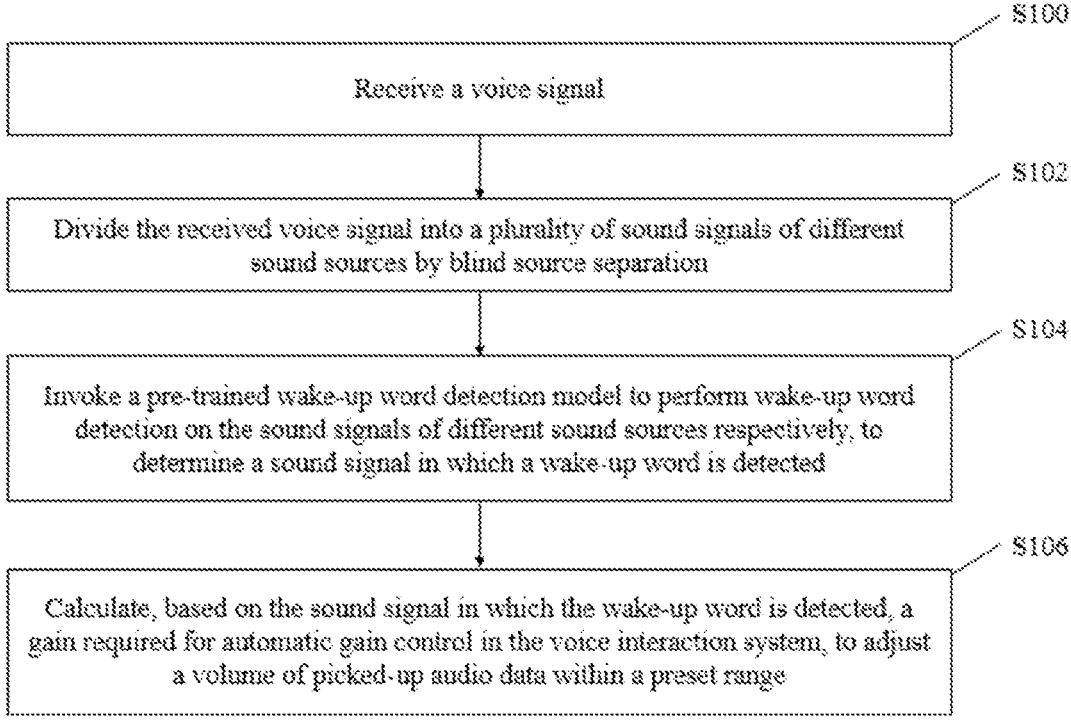
FIG. 1 schematically illustrates a flow chart of a specific embodiment of an automatic gain control method of a voice interaction system provided by the present application.

FIG. 1 illustrates a flow chart of a specific embodiment of an automatic gain control method of a voice interaction system provided by the present application. In this embodiment, the method specifically includes following steps:

At step S100, a voice signal is received.

In this step, voice signals in the environment may be picked up by a picked-up audio device. Specifically, the picked-up audio device may be a microphone array. It can be appreciated that the specific number and distribution of microphones of the microphone array do not affect the implementation of the present application. The microphone array may of course also be implemented using a single microphone.

At step S102, the received voice signal is divided into a plurality of sound signals of different sound sources by blind source separation.

After the voice signal is received, the blind source separation is used to divide the received voice signal into a plurality of sound signals of different sound sources. It will be appreciated that the blind source separation is an existing art, and the specific embodiment thereof is well known in the art, and will not be repeated herein.

At step S104, a pre-trained wake-up word detection model is invoked to perform wake-up word detection on the sound signals of different sound sources respectively, to determine a sound signal in which a wake-up word is detected.

The wake-up word detection model is obtained by pre-training on a plurality of corpora. After the sound signal is inputted, the module can output a detection result of whether or not the input sound signal containing the wake-up word by detecting the preset wake-up word. The preset wake-up word may be any predefined word.

As a specific embodiment, the wake-up word detection model may be a model obtained by pre-training using delta-LFBE as a feature. By using delta-LFBE as a feature to train the wake-up word, it is possible to make the trained wake-up word model insensitive to volume, that is, sound signals of larger/lower volume can be processed, thereby expanding the amplitude range of the voice signal received by the wake-up word model. As a specific embodiment, the amplitude range may be that the volume at the microphone is greater than 40 db.

In addition, volume-based data enhancement, i.e., amplitude value-based enhancement of the pre-stored wake-up word, may also be added during the wake-up word training, and multiple wake-up words with different amplitude values are used for simulation training, such as [−30 dB, −25 dB, −20 dB, −15 dB, −10 dB, −5 dB, −2 dB], thereby increasing the generalization ability of the wake-up word training model.

For each of sound signals of different sound sources, the wake-up word detection module may be used to perform wake-up word detection on each sound signal synchronously or asynchronously, and determine therefrom the sound signal in which a wake-up word can be detected.

At step S106, based on the sound signal in which the wake-up word is detected, a gain required for automatic gain control of the voice interaction system is calculated, to adjust a volume of picked-up audio data within a preset range.

Taking the sound signal in which the wake-up word is detected as a reference basis, the gain required for the automatic gain control of the voice interaction system is calculated, to enable the volume of the picked-up audio data being within a preset range. The preset range may be defined in advance and is not limited herein.

In the automatic gain control method of the voice interaction system provided by the present application, the voice signal is received, the received voice signal is divided into the plurality of sound signals of different sound sources by the blind source separation, the pre-trained wake-up word detection model is invoked to perform wake-up word detection on the sound signals of different sound sources respectively, to determine the sound signal in which the wake-up word is detected; and based on the sound signal in which the wake-up word is detected, the gain required for automatic gain control of the voice interaction system is calculated, to adjust the volume of picked-up audio data within a preset range. In the present application, the wake-up word detection is employed in real usage scenarios to distinguish the sound signal in which the wake-up word is detected from other noise signals, and the sound signal in which the wake-up word is detected is taken as a reference for adjusting automatic gain control, which can accurately calculate the gain required for each interaction, ensure the accuracy of speech recognition, and improve interaction experience of users.

FIG. 2 shows a flow chart of another specific embodiment of the automatic gain control method of the voice interaction system provided by the present application. The method specifically includes following steps:

At step S200, a voice signal is received.

At step S202, the received voice signal is divided into a plurality of sound signals of different sound sources by blind source separation.

At step S204, a corresponding FIFO queue is maintained for each of the sound signals of different sound sources; a value of a length N of the FIFO queue is determined based on a length of the wake-up word and a frame time of the wake-up word detection.

A product of the length N of the FIFO queue and the frame time (frame_time) of the wake-up word detection is determined by the length of the wake-up word. For example, in the case that the length of the wake-up word is 1.5 s, N*frame time is set to about 1.5 s.

At step S206, each of the sound signals of different sound sources is read on a frame-by-frame basis, the maximum absolute value of the amplitude value of the signal for each frame is calculated, and the maximum absolute value is saved in the FIFO queue.

For each of the sound signals of different sound sources, the maximum absolute value of the amplitude value of the signal for each frame is calculated, and the maximum value is saved to the FIFO queue. When the queue is full, the first element in the queue may be automatically deleted, and so on in a continuous loop.

At step S208, a pre-trained wake-up word detection model is invoked to perform wake-up word detection on the sound signals of different sound sources respectively, to determine a sound signal in which a wake-up word is detected;

At step S210, the maximum value $A_{max}$ in the FIFO queue corresponding to the sound signal in which the wake-up word is detected is calculated, and according to $$G = \begin{cases} \dfrac{A_{ref}}{A_{max}}, & A_{max} < A_{ref} \\ 1, & A_{max} \geq A_{ref} \end{cases}$$

a gain G required for a picked-up audio device in the voice interaction system is calculated; wherein $A_{ref}$ is the amplitude value of a reference audio signal.

One specific embodiment of determining the reference audio signal is to obtain the amplitude value of the reference audio signal based on the maximum allowable playback volume of the picked-up audio device. Another specific embodiment method may be to obtain the amplitude value of the reference audio signal according to a preset fixed value. As a specific embodiment, the fixed value may be preset to 90 db.

FIG. 3 shows a flow chart of another specific embodiment of the automatic gain control method of the voice interaction system provided by the present application. The method specifically includes following steps:

At step S300, a voice signal is received.

At step S302, the received voice signal is divided into a plurality of sound signals of different sound sources by blind source separation.

At step S304, a corresponding FIFO queue is maintained for each of the sound signals of different sound sources; a value of a length N of the FIFO queue is determined based on a length of a wake-up word and a frame time of the wake-up word detection.

A product of the length N of the FIFO queue and the frame time (frame_time) of the wake-up word detection is determined by the length of the wake-up word. For example, in the case that the length of the wake-up word is 1.5 s, N*frame_time is set to about 1.5 s.

At step S306, each of the sound signals of different sound sources is read on a frame-by-frame basis, the absolute value of the amplitude value of the signal for each frame is calculated, and a convolution operation is performed on the absolute value by using a Gaussian window, and after the convolution operation, the maximum value is saved in the FIFO queue.

For each of the sound signals of different sound sources, the absolute value of the amplitude value of the signal for each frame is calculated, a convolution operation is performed on the absolute value by using a Gaussian window, and after the convolution operation, the maximum value is saved in the FIFO queue. When the queue is full, the first element in the queue may be automatically deleted, and so on in a continuous loop. The Gaussian window may be a Gaussian window with a window length w of 15 or 19.

At step S308, a pre-trained wake-up word detection model is invoked to perform wake-up word detection on the sound signals of different sound sources respectively, to determine a sound signal in which a wake-up word is detected;

At step S310, the maximum value $A_{max}$ in the FIFO queue corresponding to the sound signal in which the wake-up word is detected is calculated, and according to $$G = \begin{cases} \dfrac{A_{ref}}{A_{max}}, A_{max} < A_{ref} \\ 1, A_{max} \geq A_{ref} \end{cases}$$

a gain G required for a picked-up audio device in the voice interaction system is calculated; wherein $A_{ref}$ is the amplitude value of a reference audio signal.

One specific embodiment of determining the reference audio signal is to obtain the amplitude value of the reference audio signal based on the maximum allowable playback volume of the picked-up audio device. Another specific embodiment method may be to obtain the amplitude value of the reference audio signal according to a preset fixed value. As a specific embodiment, the fixed value may be preset to 90 db.

In this embodiment, a convolution operation is performed on the absolute value of the amplitude value of the signal for each frame by using a Gaussian window, and the maximum value is calculated after the convolution operation, which can increase the stability of the calculation of maximum value and reduce the erroneous calculation of maximum value due to the transient perturbation caused by a sudden collision or other circumstances. Using this method further improves the accuracy of gain calculation.

Further, based on any of the above embodiments, after the calculating a gain required for automatic gain control in the voice interaction system, the method further includes: adjusting an analog gain to the required gain G, if an adjustable range $G_a$ of the analog gain is less than the required gain G, then adjusting the analog gain to maximum and adjusting a digital gain to $G-G_a$. After determining the gain required for automatic gain control, according to the selected configuration of the audio ADC/DAC, preferentially the analog gain of the audio ADC/DAC is adjusted. If the adjustable range $G_a$ of the analog gain is less than the required gain G, then the analog gain is adjusted to maximum and a digital gain is adjusted to $G-G_a$. In this implementation, the analog gain with a higher signal-to-noise ratio is first adjusted, and then digital gain adjustment is performed for supplement, ensuring accurate implementation of the gain adjustment.

Based on any of the above embodiments, the automatic gain control method provided in the present application may further include: restoring the gain to an initial gain $G_{init}$ after detecting the completion of the voice interaction.

Wherein the initial gain $G_{init}$ is: a gain corresponding to ensuring that the audio data picked up by the picked-up audio device is not saturated when the reference audio signal value is determined. This initial gain may ensure that the amplitude of the microphone recording data will not be truncated when the stereo plays music at the maximum loudness.

In this embodiment, the gain is restored to the initial gain $G_{init}$ after the completion of a round of voice interaction, to wait for the next wake-up word trigger. It can be appreciated that by detecting that the picked-up audio device does not detect the speaker's voice signal within a preset time period, it is determined that this round of voice interaction is completed. It can be appreciated that it is also possible to maintain the current gain after detecting the completion of the voice interaction and wait for the next wake-up word trigger.

FIG. 4 shows a structural block diagram of a specific embodiment of the automatic gain control apparatus 40 of the voice interaction system provided by the present application. The apparatus includes:

a receiving module 42 configured to receive a voice signal;

a blind source separation module 44 configured to divide the received voice signal into a plurality of sound signals of different sound sources by blind source separation;

a wake-up word detection module 46 configured to invoke a pre-trained wake-up word detection model to perform wake-up word detection on the sound signals of different sound sources respectively, to determine a sound signal in which a wake-up word is detected; and a gain determination module 48 configured to calculate, based on the sound signal in which the wake-up word is detected, a gain required for automatic gain control of the voice interaction system, to adjust the volume of picked-up audio data within a preset range.

It can be appreciated that the automatic gain control apparatus of the voice interaction system provided by the present application corresponds to the above automatic gain control method, and the internal modules 42-48 thereof are respectively used to implement steps S100-S106 of the automatic gain control method, and the specific implementation thereof may be referred to the above corresponding contents, and will not be repeated herein.

This apparatus receives a voice signal, divides the received voice signal into a plurality of sound signals of different sound sources by blind source separation, invokes a pre-trained wake-up word detection model to perform wake-up word detection on the sound signals of different sound sources respectively, to determine a sound signal in which a wake-up word is detected; calculates, based on the sound signal in which the wake-up word is detected, a gain required for automatic gain control of the voice interaction system, to adjust the volume of picked-up audio data within a preset range. The present application employs wake-up word detection in real usage scenarios to distinguish the sound signal in which the wake-up word is detected from other noise signals, and takes the sound signal in which the wake-up word is detected as an adjustment reference for performing automatic gain control, which can accurately calculate the gain required for each interaction, ensure the accuracy of speech recognition, and improve interaction experience of users.

Figure 5:
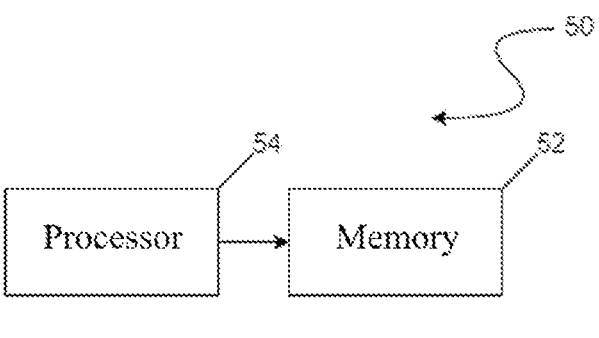
FIG. 5 schematically illustrates a structural block diagram of the voice interaction system provided by the present application.

In addition, the present application further provides a voice interaction system 50, as shown in FIG. 5, which is a structural block diagram of the voice interaction system 50 provided by the present application. The voice interaction system 50 includes: a memory 52 and a processor 54; the memory 52 is configured to store instructions; the processor 54, when invoking the instructions, executes the automatic gain control method described in any of the above.

In addition, the present application further provides a computer-readable storage medium including instructions that, when executed, implement the automatic gain control method described in any of the above.

It can be appreciated that the automatic gain control apparatus, voice interaction system, and computer-readable storage medium provided by the present application correspond to the above automatic gain control method, and the specific implementation thereof may be referred to the above contents, and will not be repeated herein.

The present application takes the sound signal in which the wake-up word is detected as an adjustment reference for performing automatic gain control, which can accurately calculate the gain required for each interaction, ensure the accuracy of speech recognition, and improve interaction experience of users.

While various embodiments of various aspects of the disclosure have been described for the purpose of this disclosure, it shall not be appreciated that the teaching of this disclosure is limited to these embodiments. The features disclosed in a specific embodiment are therefore not limited to that embodiment, but may be combined with the features disclosed in different embodiments. For example, one or more features and/or operations of the system or method according to the present application described in one embodiment may also be applied individually, in combination, or as a whole in another embodiment. Those skilled in the art will understand that there are more possible optional implementations and variants, and various changes and modifications may be made to the above system without departing from the scope defined by the claims of the present application.

What is claimed is:

1. An automatic gain control method for a voice interaction system, comprising:
   receiving a voice signal;
   dividing the received voice signal into a plurality of sound signals of different sound sources by blind source separation;
   invoking a pre-trained wake-up word detection model to perform wake-up word detection on the sound signals of different sound sources respectively, to determine a sound signal in which a wake-up word is detected; and
   for each of the plurality of sound signals of different sound sources, using the sound signal in which the wake-up word is detected as an adjustment reference for performing automatic gain control, and calculating a gain required for automatic gain control of the voice interaction system, to adjust a volume of picked-up audio data within a preset range.

2. The automatic gain control method according to claim 1, wherein after the dividing the received voice signal into a plurality of sound signals of different sound sources by blind source separation, the method further comprises:
   maintaining a corresponding FIFO queue for each of the sound signals of different sound sources; wherein a value of a length N of the FIFO queue is determined based on a length of the wake-up word and a frame time of the wake-up word detection; and
   reading each of the sound signals of different sound sources on a frame-by-frame basis, calculating a maximum absolute value of an amplitude value of the signal for each frame, and saving the maximum absolute value in the FIFO queue.

3. The automatic gain control method according to claim 2, wherein a product of the length N of the FIFO queue and the frame time of the wake-up word detection is equal to a length of the wake-up word.

4. The automatic gain control method according to claim 2, wherein the calculating a gain required for automatic gain control of the voice interaction system comprises:
   calculating a maximum value $A_{max}$ in the FIFO queue corresponding to the sound signal in which the wake-up word is detected, and according to $$G = \begin{cases} \dfrac{A_{ref}}{A_{max}}, & A_{max} < A_{ref} \\ 1, & A_{max} \geq A_{ref} \end{cases}$$

calculating a gain G required for a picked-up audio device in the voice interaction system;
   wherein $A_{ref}$ is an amplitude value of a reference audio signal, and the reference audio signal is a fixed value.

5. The automatic gain control method according to claim 4, wherein after the calculating a gain required for automatic gain control of the voice interaction system, the method further comprises:
   adjusting an analog gain to a required gain G; if an adjustable range $G_a$ of the analog gain is less than the required gain G, then adjusting the analog gain to maximum and adjusting a digital gain to $G\text{-}G_a$.

6. The automatic gain control method according to claim 5, further comprising: restoring the gain to an initial gain $G_{init}$ after detecting the completion of the voice interaction.

7. The automatic gain control method according to claim 6, wherein the initial gain $G_{init}$ is: a gain corresponding to ensuring that the audio data picked up by a picked-up audio device is not saturated when the reference audio signal value is determined.

8. The automatic gain control method according to claim 1, wherein after the dividing the received voice signal into a plurality of sound signals of different sound sources by blind source separation, the method further comprises:
   maintaining a corresponding FIFO queue for each of the sound signals of different sound sources; wherein a value of a length N of the FIFO queue is determined based on a length of the wake-up word and a frame time of the wake-up word detection; and
   reading each of the sound signals of different sound sources on a frame-by-frame basis, calculating an absolute value of an amplitude value of the signal for each frame, and performing a convolution operation on the absolute value by using a Gaussian window, and saving the maximum value in the FIFO queue after the convolution operation.

9. The automatic gain control method according to claim 8, wherein a product of the length N of the FIFO queue and the frame time of the wake-up word detection is equal to a length of the wake-up word.

10. The automatic gain control method according to claim 8, wherein the calculating a gain required for automatic gain control of the voice interaction system comprises:
   calculating a maximum value $A_{max}$ in the FIFO queue corresponding to the sound signal in which the wake-up word is detected, and according to $$G = \begin{cases} \dfrac{A_{ref}}{A_{max}}, & A_{max} < A_{ref} \\ 1, & A_{max} \geq A_{ref} \end{cases}$$

calculating a gain G required for a picked-up audio device in the voice interaction system;

wherein $A_{ref}$ is an amplitude value of a reference audio signal, and the reference audio signal is a fixed value.

11. The automatic gain control method according to claim 10, wherein after the calculating a gain required for automatic gain control of the voice interaction system, the method further comprises:

adjusting an analog gain to a required gain G; if an adjustable range $G_a$ of the analog gain is less than the required gain G, then adjusting the analog gain to maximum and adjusting a digital gain to $G–G_a$.

12. The automatic gain control method according to claim 11, further comprising: restoring the gain to an initial gain $G_{init}$ after detecting the completion of the voice interaction.

13. The automatic gain control method according to claim 12, wherein the initial gain $G_{init}$ is: a gain corresponding to ensuring that the audio data picked up by a picked-up audio device is not saturated when the reference audio signal value is determined.

14. The automatic gain control method according to claim 1, wherein the wake-up word detection model is a model obtained by pre-training using delta-LFBE as a feature.

15. A voice interaction system, comprising: a memory and a processor; wherein the memory is configured to store instructions; the processor, when invoking the instructions, executes an automatic gain control method for the voice interaction system, the method comprising:

receiving a voice signal;

dividing the received voice signal into a plurality of sound signals of different sound sources by blind source separation;

invoking a pre-trained wake-up word detection model to perform wake-up word detection on the sound signals of different sound sources respectively, to determine a sound signal in which a wake-up word is detected; and for each of the plurality of sound signals of different sound sources, using the sound signal in which the wake-up word is detected as an adjustment reference for performing automatic gain control, calculating a gain required for automatic gain control of the voice interaction system, to adjust a volume of picked-up audio data within a preset range.

16. A non-transitory computer-readable storage medium comprising instructions that, when executed, implement an automatic gain control method for a voice interaction system, the method comprising:

receiving a voice signal;

dividing the received voice signal into a plurality of sound signals of different sound sources by blind source separation;

invoking a pre-trained wake-up word detection model to perform wake-up word detection on the sound signals of different sound sources respectively, to determine a sound signal in which a wake-up word is detected; and for each of the plurality of sound signals of different sound sources, using the sound signal in which the wake-up word is detected as an adjustment reference for performing automatic gain control, calculating a gain required for automatic gain control of the voice interaction system, to adjust a volume of picked-up audio data within a preset range.

* * * * *